United States Patent
Park et al.

(10) Patent No.: US 9,354,605 B2
(45) Date of Patent: May 31, 2016

(54) APPARATUS AND METHOD FOR FORMING 3-DIMENSIONAL HOLOGRAPHIC IMAGE USING SCATTERING LAYER

(71) Applicant: Korea Advanced Institute of Science and Technology, Daejeon (KR)

(72) Inventors: YongKeun Park, Daejeon (KR); Hyeon Seung Yu, Busan (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/453,448

(22) Filed: Aug. 6, 2014

(65) Prior Publication Data

US 2015/0241843 A1    Aug. 27, 2015

(30) Foreign Application Priority Data

Feb. 21, 2014    (KR) .................. 10-2014-0020647

(51) Int. Cl.
*G03H 1/08*    (2006.01)
*G03H 1/22*    (2006.01)
*G03H 1/00*    (2006.01)

(52) U.S. Cl.
CPC ........... *G03H 1/0808* (2013.01); *G03H 1/2205* (2013.01); *G03H 1/2294* (2013.01); *G03H 2001/0072* (2013.01); *G03H 2210/30* (2013.01); *G03H 2223/14* (2013.01)

(58) Field of Classification Search
CPC .................. G03H 1/04; G03H 1/0465; G03H 2001/0469; G03H 2001/0471; G03H 1/06
See application file for complete search history.

(56) References Cited

U.S. PATENT DOCUMENTS

2010/0238529 A1*  9/2010 Sampsell ................. G02B 5/32
                                                              359/15

* cited by examiner

*Primary Examiner* — Jennifer L. Doak
(74) *Attorney, Agent, or Firm* — Marshall, Gerstein & Borun LLP

(57) ABSTRACT

A method for forming a three-dimensional holographic image includes identifying a transmission matrix of a scattering material, calculating an incident wave-front corresponding to wave-front information for forming a three-dimensional holographic image, using the identified transmission matrix, and forming the calculated incident wave-front by controlling a wave-front control to modulate a light projected from a light source and forming a three-dimensional holographic image.

11 Claims, 14 Drawing Sheets

APPARATUS AND METHOD FOR FORMING 3-DIMENSIONAL HOLOGRAPHIC IMAGE USING SCATTERING LAYER

This application claims priority from and the benefit of Korean Patent Application No. 10-2014-0020647, filed on Feb. 21, 2014, which is hereby incorporated by reference for all purposes as if fully set forth herein.

BACKGROUND OF THE DISCLOSURE

1. Field of the Disclosure

Exemplary embodiments of the disclosure relate to an apparatus and a method for forming a 3-dimensional holographic image using a scattering layer.

2. Discussion of the Background

A method for forming a holographic image is a technique for playing the most realistic 3-dimensional image by directly making a wave-front of light having 3-dimensional image information.

FIG. 1 is a diagram to describe an example of a conventional method for forming a holographic image. A conventional image forming apparatus proposed according to prior art modulates a wave-front of the light projected from a light source 110 into 3-dimensional image information, using a wave-front control (WC, 120), and generates a holographic image via refraction using a lens 130. In this instance, when a rate of the image size to a view angle allowing 3-dimensional image viewing is uniformly limited. In other words, the image size has to be decreased to increase the view angle and the view angle has to be decreased to increase the image size disadvantageously. To overcome such a disadvantage, there are under progress technologies for realizing an image with a broad view angle and a large area, using a large-sized wave-front control 120. As the size of the wave-front control 120 is increased, it costs much to manufacture the wave-front control and the time taken to calculate image information is increased such that it may be difficult to process the image in real-time disadvantageously.

In addition, a conventional projector screen is employed to project a two-dimensional image.

FIG. 2 is a diagram illustrating a conventional projector screen. A two-dimensional image screen 210 consists of a gray or white uniform surface and the two-dimensional image projected to a projector 220 is focused on the surface of the two-dimensional image accurately.

A screen for projecting a three-dimensional image which is commercially used in a movie theater is equal to the two-dimensional image screen 210 functionally. However, the image projected to a projector for projecting a three-dimensional stereoscopic image is configured of two polarized lights and it forms a three-dimensional image, using binocular disparity when a user is wearing polarizing glasses. In this instance, polarizing glasses are required to cause much inconvenience and the two-dimensional image screen cannot be a direct three-dimensional image screen. There are proposed technologies in which lenses are arranged on a transparent glass surface and a light projected from a projector transmits the lenses and a three-dimensional image is formed near the glass surface. Those technologies have a limited depth of image information and a limited view angle which are caused by a focal distance of glass surface lenses. The technologies consider only the intensity of the light, not controlling a wave-front of the light corresponding to the three-dimensional image, such that they cannot be real three-dimensional image technologies.

SUMMARY OF THE DISCLOSURE

Exemplary embodiments of the present disclosure provide an apparatus and a method for forming an image which may overcome limitation of a view angle and an image size, using light control performed by a wave-front control and scattering of light with a broad spatial frequency elements enabled by a scattering layer.

Exemplary embodiments of the present disclosure also provide an apparatus and a method for forming an image which may realize a three-dimensional image easily, using a multi-scattering material surface, not a conventional uniform surface provided in a screen.

Exemplary embodiments of the present disclosure disclose a method for forming a three-dimensional holographic image including identifying a transmission matrix of a scattering material; calculating an incident wave-front corresponding to wave-front information for forming a three-dimensional holographic image, using the identified transmission matrix; and forming the calculated incident wave-front by controlling a wave-front control to modulate a light projected from a light source and forming a three-dimensional holographic image.

The transmission matrix of the scattering material may be measured based on a linear relation between an incident wave-front of a light incident on the scattering material and a transmission wave-front scattered while the incident wave-front may be transmitting the scattering material.

The identifying of the transmission matrix of the scattering material may include controlling the light source and the wave-front control to different incident wave-fronts to be projected to the scattering material; measuring transmission wave-fronts formed by transmission of the different incident wave-fronts into the scattering material; and measuring a linear relation between an incident wave-front and a transmission wave-front corresponding to each other as the transmission matrix.

The identifying of the transmission matrix of the scattering material may include storing and managing the pre-measured transmission matrix in a storage unit; and extracting the transmission matrix from the storage unit.

In another aspect, a method for forming an image for forming a three-dimensional holographic image includes identifying a reflection matrix of a scattering layer provided in a screen; calculating an incident wave-front corresponding to wave-front information for forming a three-dimensional holographic image, using the identified transmission matrix; and forming the calculated incident wave-front by controlling a projector to modulate a projector or controlling a wave-front control to modulating a light projected from a light source and forming a three-dimensional holographic image by reflecting of a scattering layer provided in the screen after projecting the formed incident wave-front to the screen.

A reflection matrix of the scattering layer may be measured based on a linear relation between an incident wave-front of a light incident on the scattering layer and a reflection wave-front of a light reflected in the scattering layer.

The identifying of the reflection matrix of the scattering layer provided in the screen may include controlling the light source and the wave-front control to different incident wave-fronts to be projected to the scattering material; measuring reflection wave-fronts formed by transmission of the different incident wave-fronts into the scattering material; and measuring a linear relation between an incident wave-front and a reflection wave-front corresponding to each other as the reflection matrix.

The identifying of the reflection matrix of the scattering material may include storing and managing the pre-measured reflection matrix in a storage unit; and extracting the reflection matrix from the storage unit.

In a further aspect, an apparatus for forming a three-dimensional holographic image includes a light source for projecting a light; a modulation unit for forming incident wave-front by modulating the light; a scattering material for forming a transmission wave-front by scattering the formed incident wave-front; and a controller for calculating a needed incident wave-front based on wave-front information needed to form a three-dimensional holographic image and a transmission matrix of the scattering material and for forming the calculated incident wave-front and controlling the light source and the modulation unit to project the calculated incident wave-front to the scattering material.

The controller may control the light source and the wave-front control to project different incident wave-fronts to the scattering material, and measure transmission wave-fronts formed while the different incident wave-fronts are transmitting the scattering material, and measure a linear relation of an incident wave-front and a transmission wave-front corresponding to each other as the transmission matrix.

The apparatus for forming the three-dimensional holographic image may further include a storage unit for storing and managing the pre-measured transmission matrix, wherein the controller calculates the needed incident wave-front based on the transmission matrix extracted from the storage unit.

In a still further, an apparatus for forming a three-dimensional holographic image includes a modulation unit for forming an incident wave-front by modulating a light; a screen comprising a scattering layer for forming a reflection wave-front by scatter-reflecting the formed incident wave-front; and a controller for calculating a needed incident wave-front based on wave-front information needed to form a three-dimensional holographic image and a reflection matrix of the scattering material and for forming the calculated incident wave-front and controlling the light source and the modulation unit to project the calculated incident wave-front to the scattering material.

The modulation unit may include a light source and a wave-front control, or a projector.

The controller may control the modulation unit to project different incident wave-fronts to the scattering material, and measure reflection wave-fronts formed while the different incident wave-fronts are reflected in the scattering material, and measure a linear relation of an incident wave-front and a transmission wave-front corresponding to each other as the reflection matrix.

The apparatus for forming the three-dimensional holographic image may further include a storage unit for storing and managing the pre-measured reflection matrix, wherein the controller calculates the needed incident wave-front based on the reflection matrix extracted from the storage unit.

Exemplary embodiments of the present disclosure provide an apparatus and a method for forming an image which may overcome limitation of a view angle and an image size, using light control performed by a wave-front control and scattering of light with a broad spatial frequency elements enabled by a scattering layer.

Exemplary embodiments of the present disclosure also provide an apparatus and a method for forming an image which may realize a three-dimensional image easily, using a multi-scattering material surface, not a conventional uniform surface provided in a screen.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Figure 1:
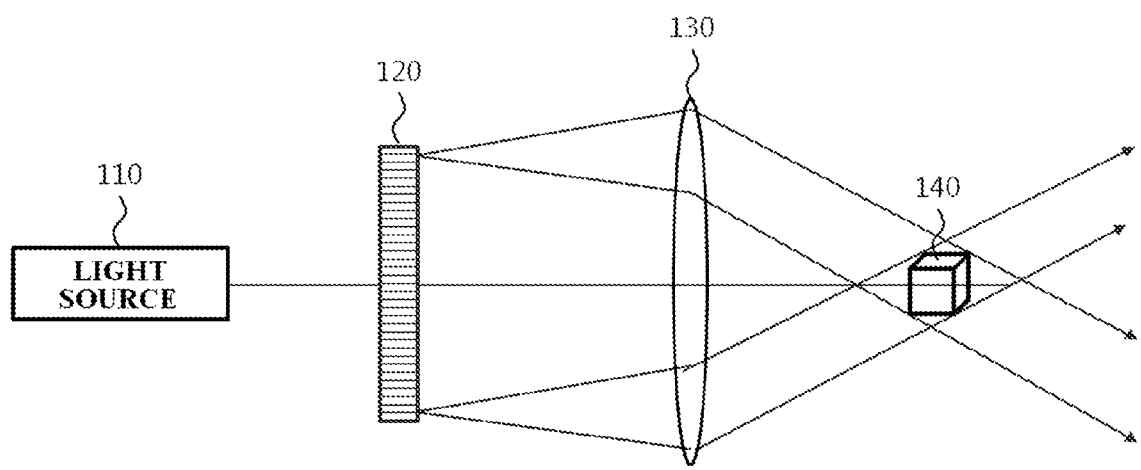
FIG. 1 is a diagram illustrating an example of a conventional holographic image forming method.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements. It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing. Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An essential core of hologram image forming is to make a free wave-front having three-dimensional (hereinafter, 3D) image information. In the embodiments of the present disclosure, multi-scattering technology is integrated into a conventional holographic image forming apparatus, to form a 3D holographic image.

Figure 3:
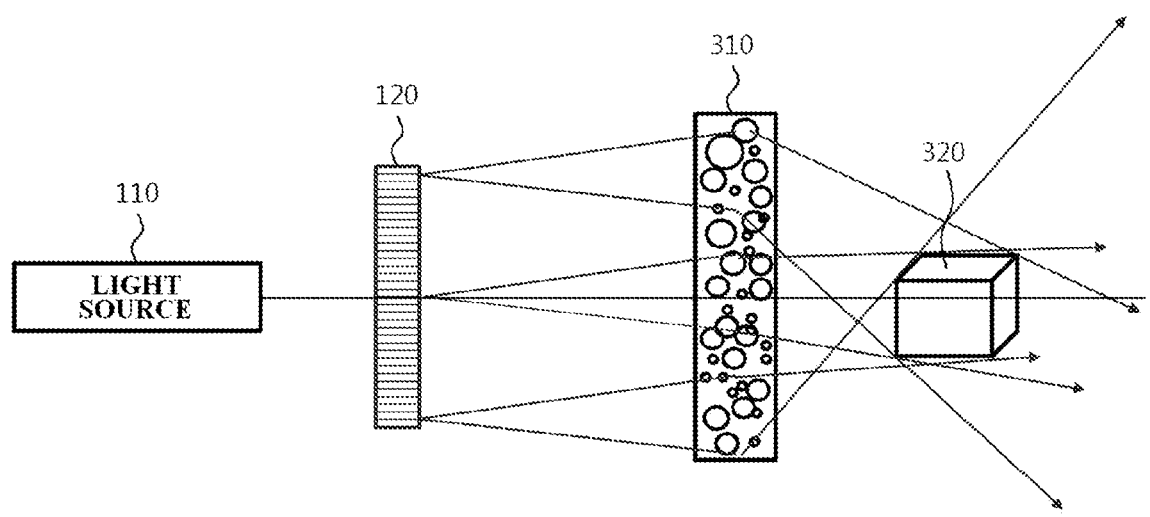
FIG. 3 is a diagram illustrating an example of a method for forming an image according to exemplary embodiments of the present disclosure.

FIG. 3 is a diagram illustrating an example of a method for forming an image according to exemplary embodiments of the present disclosure. Compared with the apparatus shown in FIG. 1, an image forming apparatus shown in FIG. 3 includes a light source 110, a wave-front control 120 and a scattering material 310 which is provided instead of the lens 130. The image forming apparatus may further include a controller (not shown) for controlling the light source 110 and the wave-front control 120. If necessary, the image forming apparatus may further include a storage unit (not shown) for storing information needed to control the light source 110 and the wave-front control 120 selectively.

As mentioned above, in the conventional apparatus, the size or view angle of the image formable thereby is uniformly limited in case the characteristic of the wave-front control 120 is determined. For example, an image is focused on a wave-front of the light modulated by the wave-front control 120 by the lens 130, to form the 3D holographic image. For instance, the wave-front control 120 may include one of a spatial light modulator, a deformable mirror device, a dynamic mirror device, a photorefractive material and a holographic phase film.

In contrast, the image forming apparatus according to the exemplary embodiments of the present disclosure may scatter a wave-front of the light modulated by the wave-front control 120, using the scattering material 310, to form a 3D holographic image. For instance, when using the lens 310, a spatial frequency of a light distributing to image formation is limited. However, when using the scattering material 310, multi-scattering enables a larger-sized image expressed with relatively larger spatial frequency elements such that a 3D holographic image with a broader view angle can be formed.

Figure 4:
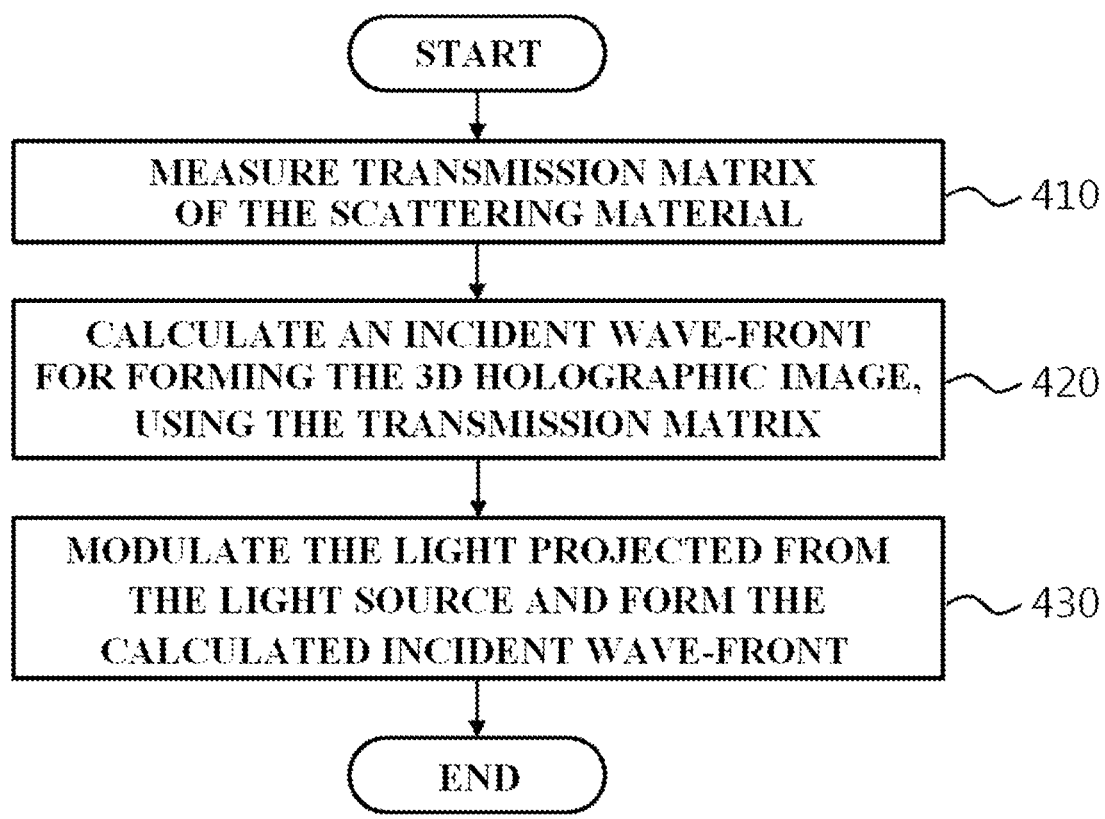
FIG. 4 is a flow chart illustrating a method for forming an image according to exemplary embodiments of the present disclosure.

FIG. 4 is a flow chart illustrating a method for forming an image according to exemplary embodiments of the present disclosure.

In a step (410), the image forming apparatus may measure transmission matrix of the scattering material. The transmission matrix may mean a linear relation between an incident wave-front and a transmission wave-front in the scattering material. For instance, the image forming apparatus may measure each transmission wave-front with respect to different incident wave-fronts, to measure a transmission matrix. The incident wave-front may mean the wave-front incident on the scattering material and the transmission wave-front may means the wave-front scattered while the incident wave-front is transmitting the scattering material. In other words, the transmission matrix of the scattering material may be measured based on a linear relation between the incident wave-front as a wave-front of the light incident on the scattering material and the transmission wave-front as a scattered wave-front while the light is transmitting the scattering material.

For instance, the image forming apparatus may control the light source and the wave-front control to enable different incident wave-fronts to project to the scattering material. Also, the image forming apparatus may measure the transmission wave-fronts formed, while the different incident wave-fronts are transmitting the scattering material, and measure a linear relation between corresponding incident and transmission wave-fronts as the transmission matrix.

Figure 5:
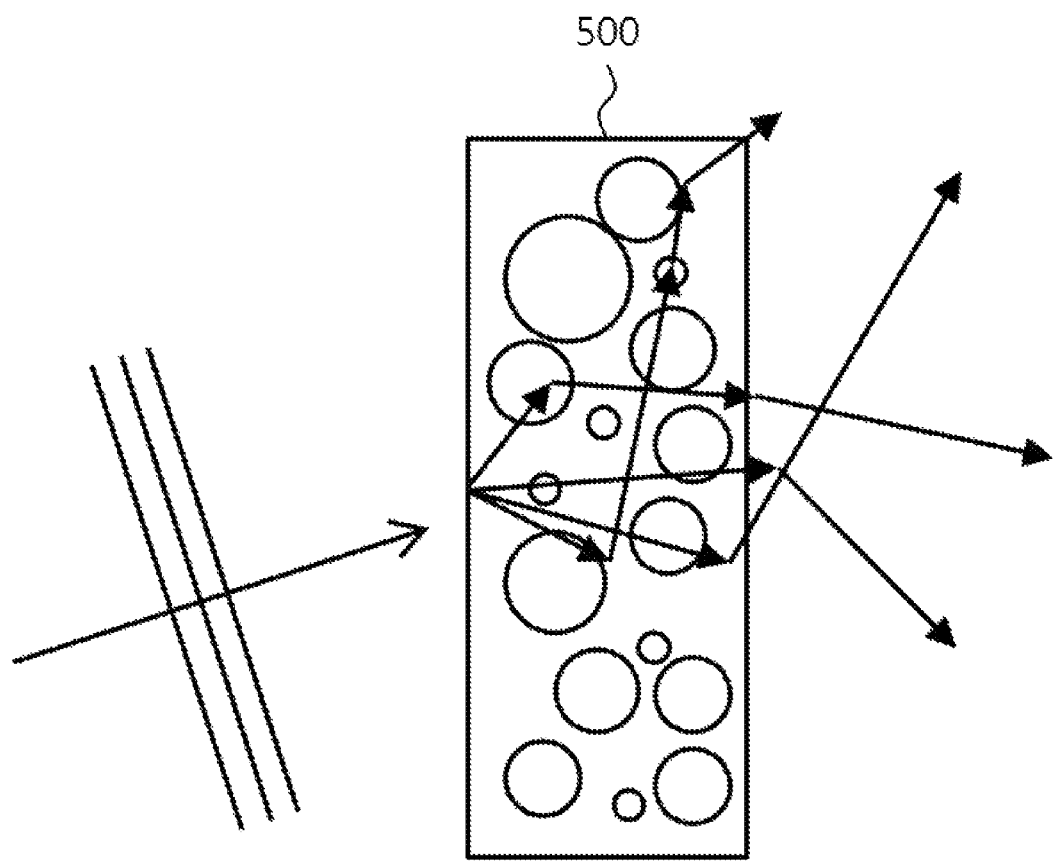
FIGS. 5, 6 and 7 are diagrams illustrating examples of a transmission wave-front based on an incident wave-front of a scattering material according to exemplary embodiments of the present disclosure.
Figure 6:
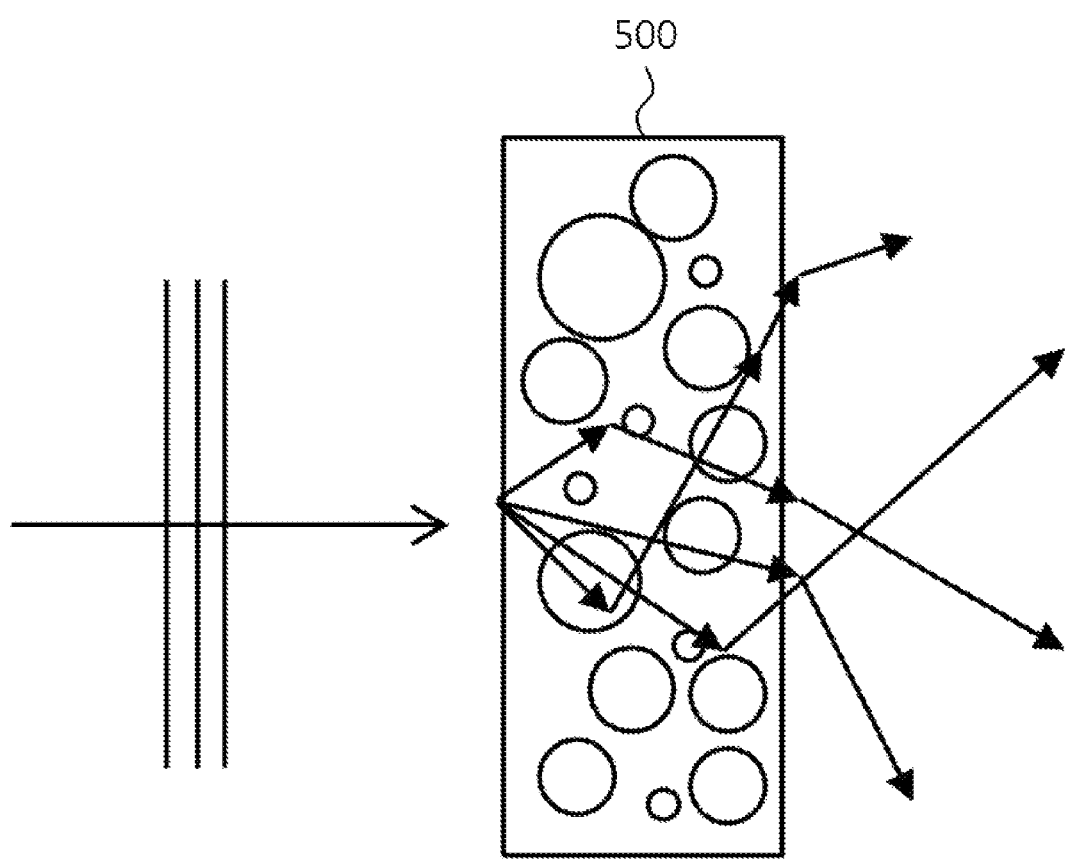
Figure 7:
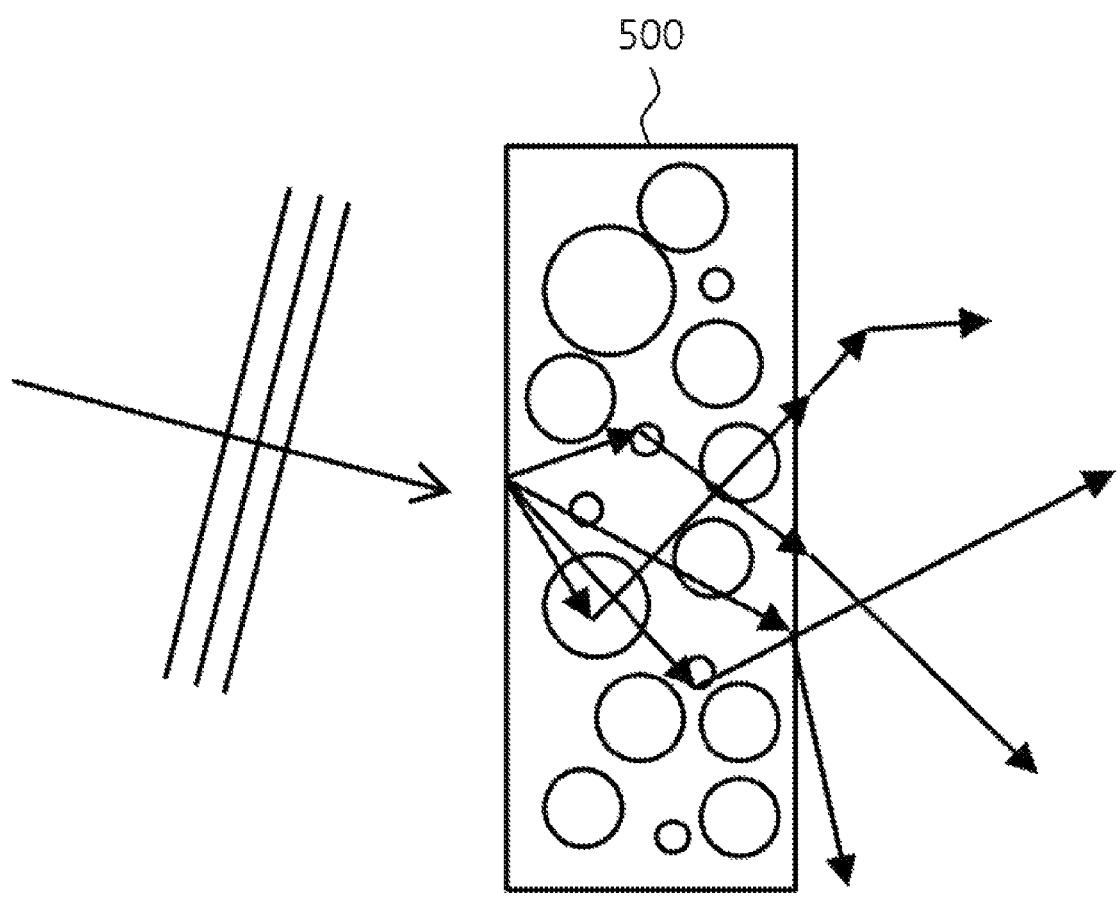

FIGS. 5, 6 and 7 are diagrams illustrating examples of a transmission wave-front based on an incident wave-front of a scattering material according to exemplary embodiments of the present disclosure. FIGS. 5 through 7 show that transmission wave-fronts are varied based on angles of the incident front-waves incident on a scattering material 500.

Referring to FIG. 4, the image forming apparatus may measure a transmission wave-front with respect to different incident wave-fronts, only to measure the transmission matrix. If necessary, the transmission matrix may be pre-measured in accordance with the scattering material. For instance, the pre-measured transmission matrix may be stored in the storage unit (not shown) of the image forming apparatus mentioned above and the image forming apparatus may identify and use the transmission matrix stored in the storage unit (not shown).

In a step (420), the image forming apparatus may calculate an incident wave-front for forming the 3D holographic image, using the transmission matrix. For instance, the image forming apparatus may calculate which transmission wave-front the light transmitting the scattering material has to have to form the 3D holographic image and calculate an incident wave-front corresponding to the calculated transmission wave-front, using the transmission matrix.

In a step (430), the image forming apparatus may modulate the light projected from the light source and form the calculated incident wave-front. After that, the image forming apparatus may transmit the formed incident wave-front into the scattering material and then form the 3D holographic image. For instance, the image forming apparatus project the light of the light source to the wave-front control and the wave-front control may modulate the projected light, only to form the calculated incident wave-front. Once the scattering material penetrates the scattering material, a desired 3D holographic image can be formed.

Figure 8:
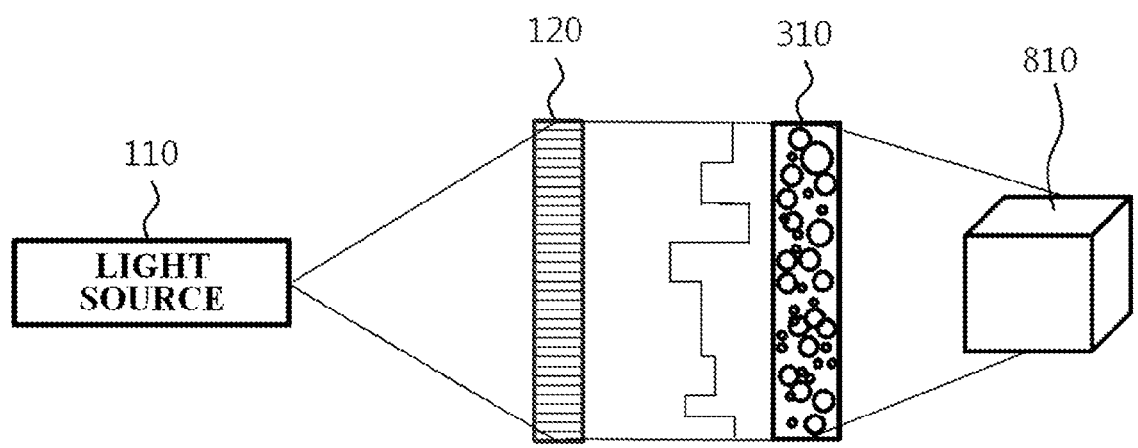
FIG. 8 is a diagram illustrating a process of forming a three-dimensional holographic image according to exemplary embodiments of the present disclosure.

FIG. 8 is a diagram illustrating a process of forming a three-dimensional holographic image according to exemplary embodiments of the present disclosure. The image forming apparatus may calculate an incident wave-front corresponding to the transmission wave-front needed to form the desired 3D holographic image 810, using the transmission matrix stored in the storage unit. Once calculating the incident wave-front, the image forming apparatus may control the light source 110 to project the light to the wave-front control 120 and control the wave-front control 120 to modulate the projected light. The modulated wave-front may form the desired 3D holographic image as calculated before.

The method for forming the 3D image, using holography, is the most idealistic 3D image forming method requiring not special glasses. However, such the conventional method for forming the 3D image, using the holography, has difficulty in industrialization because of a narrow view angle or limited large area image. The image forming apparatus according to the embodiments of the present disclosure can jump over the limit of the conventional image size and view angle through the wave-front control of the large spatial frequency elements enabled by the multi-scattering. In addition, the image forming apparatus according to the embodiments of the disclosure has an advantage of easy realization enabled only by adding the scattering material to the image apparatus using the conventional wave-front control.

Figure 2:
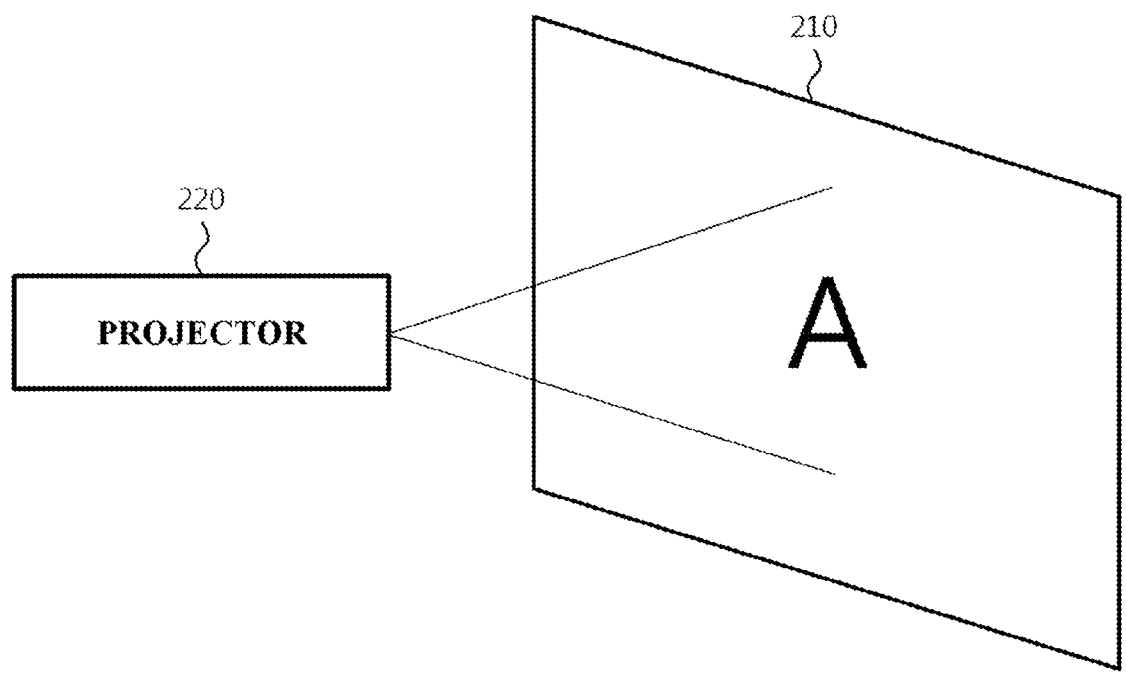
FIG. 2 is a diagram illustrating a projector screen according to the conventional holographic image forming method.
Figure 9:
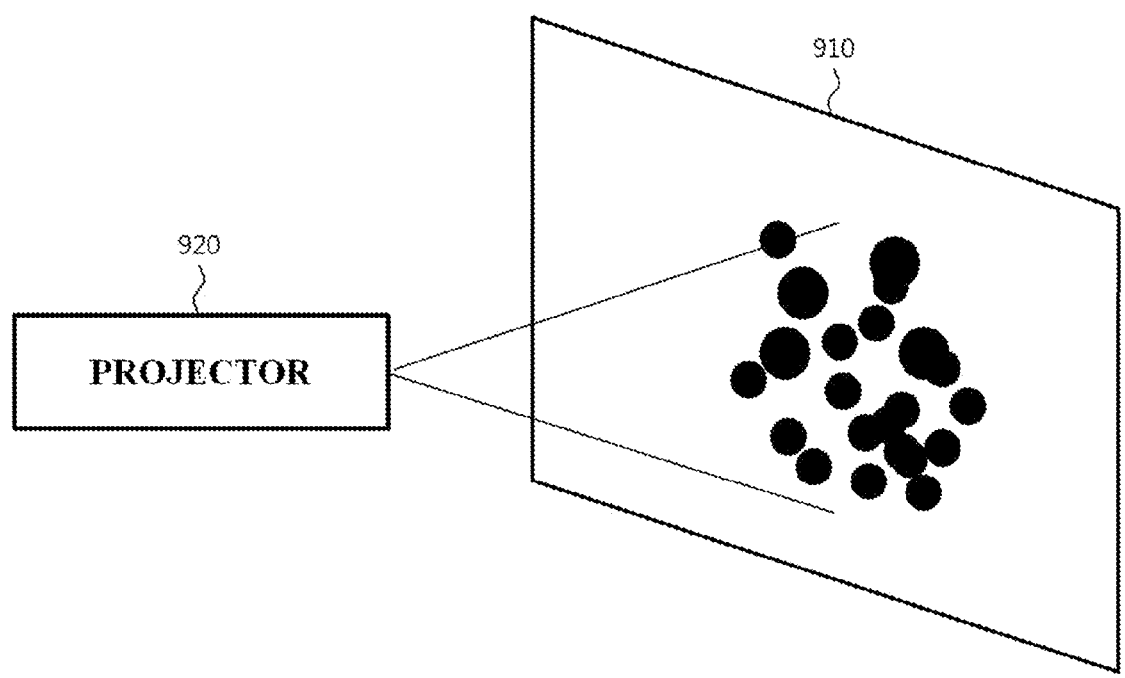
FIG. 9 is a diagram illustrating an example of a screen having a scattering material on a surface thereof according to exemplary embodiments of the present disclosure.

FIG. 9 is a diagram illustrating an example of a screen having a scattering material on a surface thereof according to exemplary embodiments of the present disclosure. Referring to FIG. 2, the 2D image screen 210 configured of the gray or white uniform surface and the projector 220 for projecting the 2D image by focusing the image on the surface of the 2D image screen 210 are described. However, the image forming apparatus according to this embodiment may include a screen 910 having a scattering material (or a scattering layer) provided on a surface thereof, instead of the 2D image screen 210 having the uniform surface. At this time, once a projector 920 projected an image, the projected image has a random pattern, not focused clearly. However, the incident wave-front is controlled such that it can be possible to form a 3D holographic image, using the wave-front reflected from the scattering material.

At this time, an incident wave-front and a reflection wave-front of the scattering material may have a linear relation which can be expressed as a reflection matrix.

Figure 10:
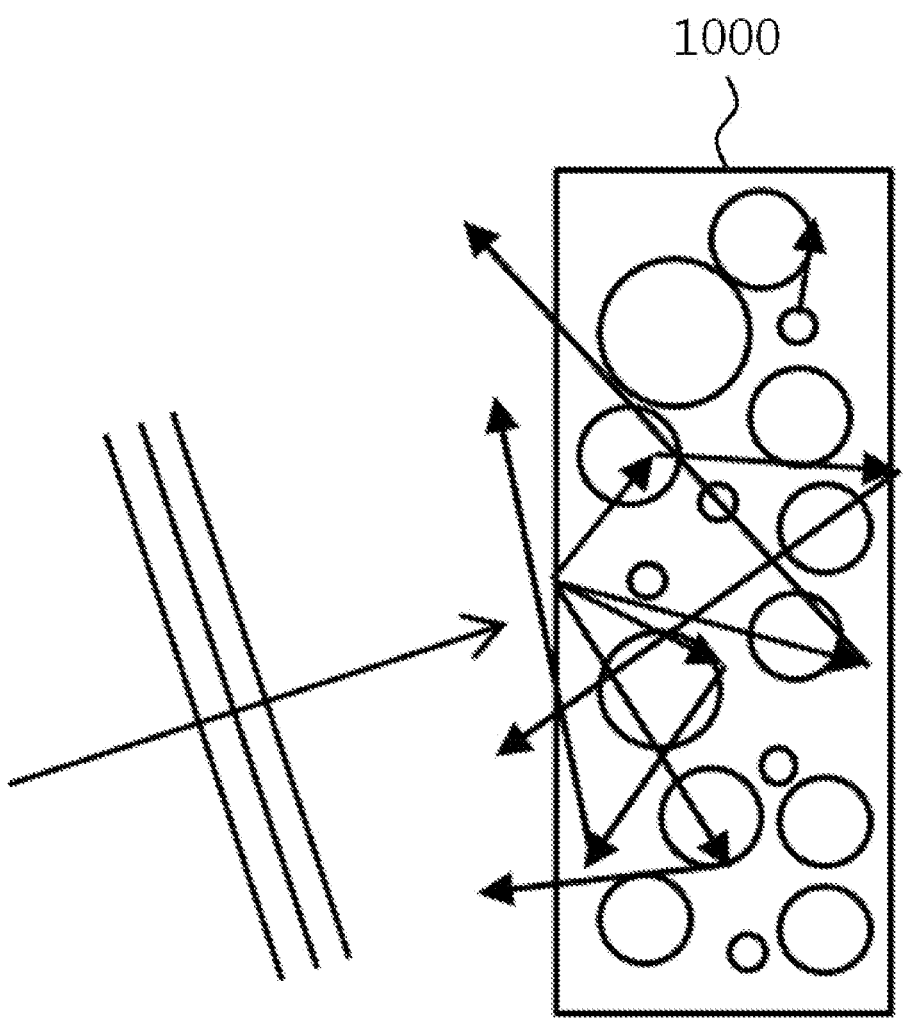
FIGS. 10, 11 and 12 are diagrams illustrating examples of a reflection wave-front based on an incident wave-front of a scattering material according to exemplary embodiments of the present disclosure.
Figure 11:
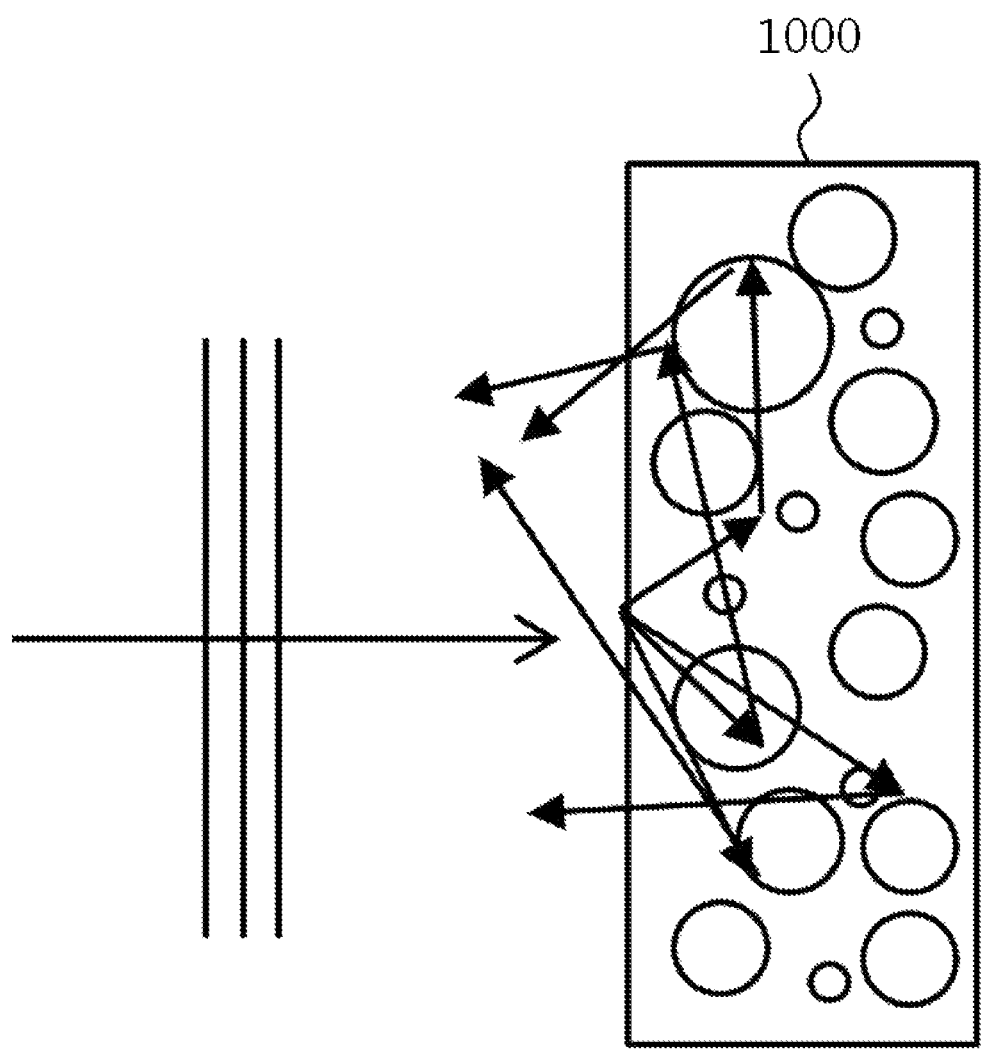
Figure 12:
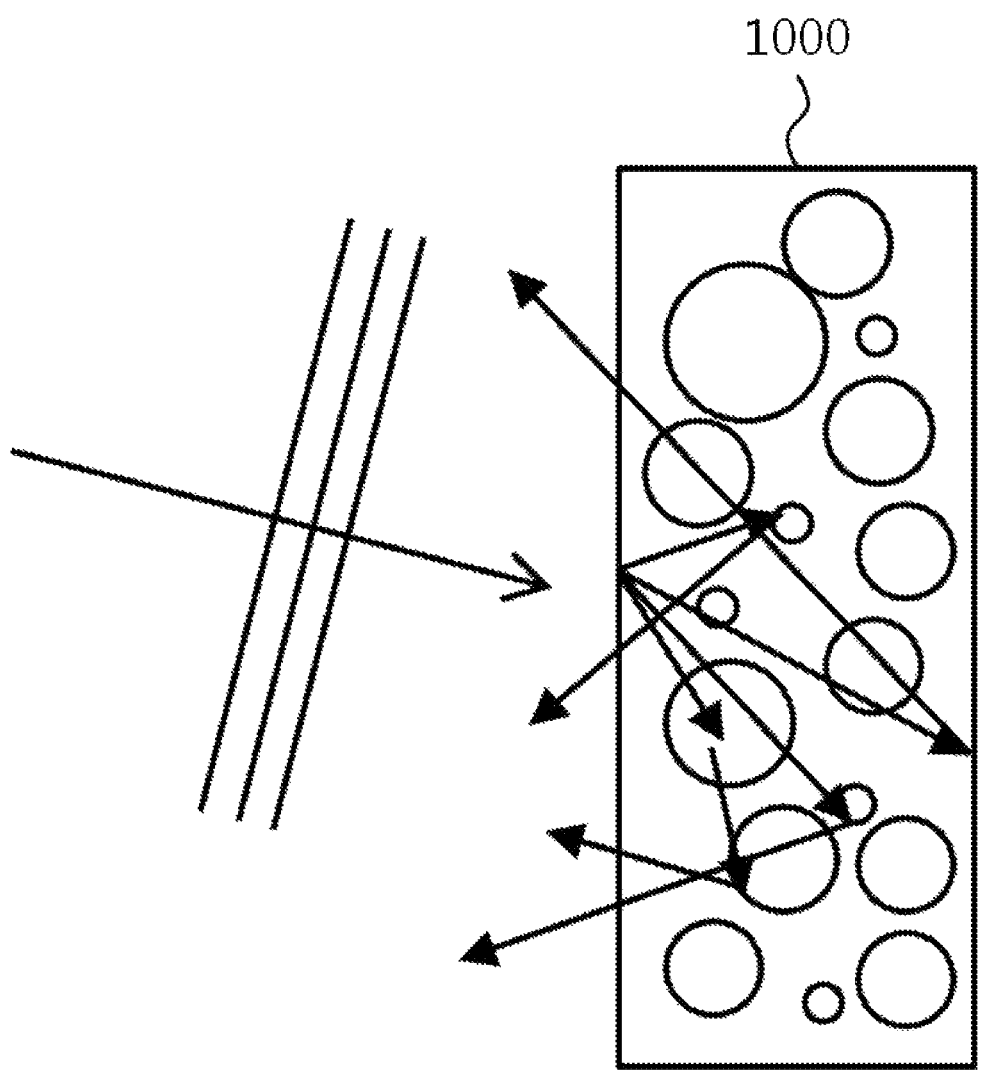

FIGS. 10, 11 and 12 are diagrams illustrating examples of a reflection wave-front based on an incident wave-front of a scattering material according to exemplary embodiments of the present disclosure. in FIGS. 10 through 12, the incident wave-front is varied based on an angle of the incident wave-front incident on the scattering material 1000. In the embodiments shown in FIGS. 5 through 7 described above, the transmission matrix expressed by the linear relation between the incident wave-front and the transmission wave-front formed while transmitting the scattering material 500 is used. However, in this embodiment, the reflection matrix expressed by the linear relation between the incident wave-front and the reflection wave-front formed while the incident wave-front is reflected in the scattering material 1000 is used.

For the light reflected in the scattering material 1000 to form the 3D holographic image, an incident wave-front corresponding to a reflection wave-front is calculated, using the reflection matrix, and the calculated incident wave-front is modulated by the wave-front control, such that a desired reflection wave-front can be formed. At this time, the reflection wave-front is formed by multi-scattering and it can have large spatial frequency elements such that it can be possible to project a 3D holographic image which is viewable with a broad view angle.

Figure 13:
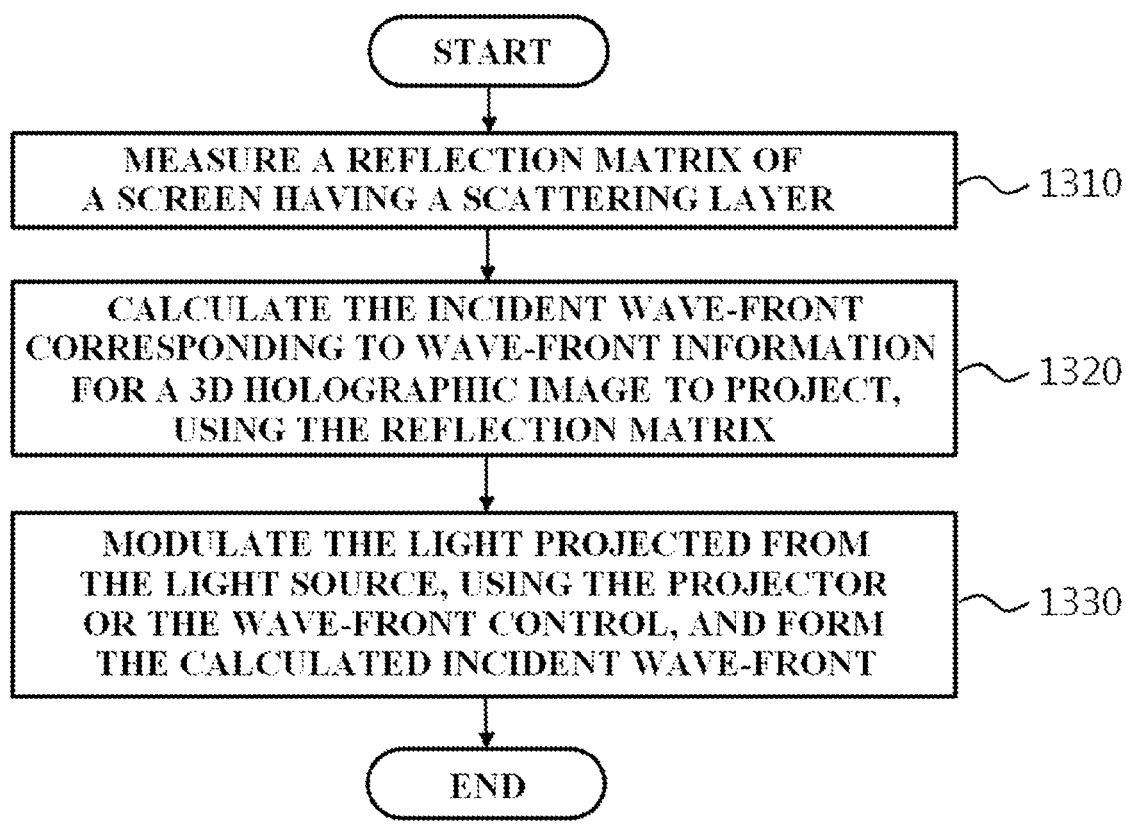
FIG. 13 is a flow chart illustrating a method for forming an image according to exemplary embodiments of the present disclosure.

FIG. 13 is a flow chart illustrating a method for forming an image according to exemplary embodiments of the present disclosure.

In a step (1310), an image forming apparatus may measure a reflection matrix of a screen having a scattering layer. Such a reflection matrix may be measured based on a linear relation between an incident wave-front of the light incident on the scattering layer and a reflection wave-front of the light reflected in the scattering layer.

For instance, the step 1310 may include a step of controlling the projector to project different incident wave-fronts to the scattering layer of the screen or controlling the light source and the wave-front control, a step of measuring reflection wave-fronts formed while different incident wave-fronts are reflected, and a step of measuring a linear relation between an incident wave-front and a reflection wave-front corresponding to each other. For that, a controller (not shown) provided in the image forming apparatus may control the projector or the light source and the wave-front control to project the different incident wave-fronts to the scattering layer of the screen and it may measure reflection wave-fronts formed while the different incident wave-fronts are reflected in the scattering layer, to measure the linear relation between the incident wave-front and the reflection wave-front corresponding to each other as the reflection matrix.

In another embodiment, the step (1310) may include a step of managing a pre-measured reflection matrix in the storage unit and a step of extracting the reflection matrix from the storage unit. For that, the image forming apparatus may further include the storage unit for storing and managing the pre-measured reflection matrix and the controller (not shown) provided in the image forming apparatus may extract the reflection matrix from the storage unit to use.

In a step (1320), the image forming apparatus may calculate the incident wave-front corresponding to wave-front information for a 3D holographic image to project, using the reflection matrix.

In a step (1330), the image forming apparatus may modulate the light projected from the light source, using the projector or the wave-front control, and form the calculated incident wave-front. After that, the image forming apparatus may reflect the formed incident wave-front in the screen and form a 3D holographic image.

Figure 14:
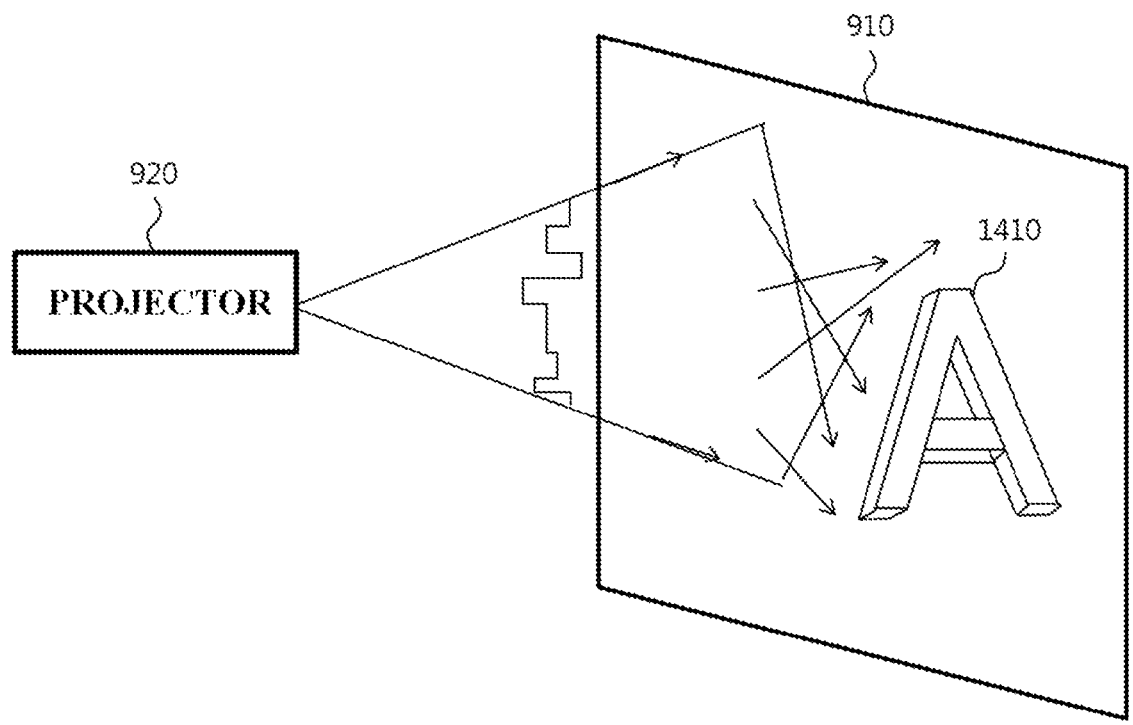
FIG. 14 is a diagram illustrating an example of a method for forming a three-dimensional holographic image according to exemplary embodiments of the present disclosure.

FIG. 14 is a diagram illustrating an example of a method for forming a three-dimensional holographic image according to exemplary embodiments of the present disclosure. In FIG. 14, there are provided a screen 910 having the scattering material (or the scattering layer) mentioned above, referring to FIG. 9, and a projector 920. Assuming that the reflection matrix for the screen 910 is pre-measured, the image forming apparatus may set wave-front information (information on the reflection wave-front) for a desired 3D holographic image 1410. At this time, an incident wave-front corresponding to the set wave-front information can be calculated based on the reflection matrix. The projector may modulate the incident wave-front and project the modulated incident wave-front to the screen 910, such that the reflection wave-front reflected in the scattering material can form the 3D holographic image 1410. The projector 910 may be replaced with the light source 110 and the wave-front 120, if necessary.

The conventional 3D image screen proposed by the prior art can be viewed only when the user wears special glasses to view 3D image. Only when the conventional screen is replaced with the screen having the multi-scattering layer, using the method proposed by the embodiments of the present disclosure, it can be possible to form the 3D image. The modulation of the light incident on the scattering layer may be performed by using the conventional projector easily and it may be applicable to other types of wave-front control systems, without additional system elements.

According to the embodiments of the present disclosure, the limited view angle and the limited image size can be overcome by using the light control technology which uses the scattering of the light having the broad spatial frequency elements enabled by the scattering layer and the wave-front control. The surface having the multi-scattering material is used as the screen, not the conventional uniform surface, which can realize the 3D image easily.

The apparatus method described hereinabove may be executed in any suitable device realized by hardware components, software components, and/or a combination of hardware and software components. For instance, the device and components may be realized by using one or more common computers or special purpose computers, which may include a processor, a controller, an Arithmetic Logic Unit (ALU), a digital signal processor, a microcomputer, a Field Programmable Array (FPA), a Programmable Logic Unit (PLU), a microprocessor. The device and components may implement an instruction and respond to the instruction. A processor may execute an operating system (OS) and one or more software applications running on the OS. The processor may store, process, and create data in response to the implementation of software.

The software may include a computer program, a code, an algorithm, an instruction, and any combination thereof. The software may include a mechanical language code made by a compiler and a high level language code implementable by a computer, using an interpreter, and the like. The software may be dispersed on a computer system or through a network. The software and data may be stored or implemented in one or more computer readable recording medium.

The method according to the embodiments of the disclosure may be realized as a program implementable by diverse computer means and it may be recorded in a computer readable medium as a program command. The computer readable medium may include a program command, a data file, a data structure or combination of them. The program command recorded in the medium may be configured for exemplary embodiments of the disclosure. Examples of computer readable medium include magnetic medium such as a hard disk, a floppy disk, optical medium such as CD-ROM and DVD, magneto-optical medium such as a floptical disk, and a hardware device such as ROM, RAM, and a flash memory. The hardware device may be configured to execute one or more software modules to implement the exemplary embodiments.

It will be apparent to those skilled in the art that various modifications and variations can be made in the present disclosure without departing from the spirit or scope of the disclosed subject matter.

Thus, it is intended that the present disclosure cover the modifications and variations of the disclosed subject matter provided they come within the scope of the appended claims and their equivalents.

What is claimed is:

1. A method for forming a three-dimensional holographic image comprising:
    identifying a transmission matrix of a scattering material;
    calculating an incident wave-front corresponding to wave-front information for forming a three-dimensional holographic image, using the identified transmission matrix; and
    forming the calculated incident wave-front by controlling a wave-front control to modulate a light projected from a light source and forming a three-dimensional holographic image,
    wherein the transmission matrix of the scattering material is measured based on a linear relation between an incident wave-front of a light incident on the scattering material and a transmission wave-front scattered while the incident wave-front is transmitting the scattering material.

2. The method for forming the three-dimensional holographic image of claim 1, wherein the identifying of the transmission matrix of the scattering material comprises,
    storing and managing the pre-measured transmission matrix in a storage unit; and
    extracting the transmission matrix from the storage unit.

3. A method for forming a three-dimensional holographic image comprising:
    identifying a transmission matrix of a scattering material;
    calculating an incident wave-front corresponding to wave-front information for forming a three-dimensional holographic image, using the identified transmission matrix; and
    forming the calculated incident wave-front by controlling a wave-front control to modulate a light protected from a light source and forming a three-dimensional holographic image,
    wherein the identifying of the transmission matrix of the scattering material comprises,
    controlling the light source and the wave-front control to different incident wave-fronts to be projected to the scattering material;
    measuring transmission wave-fronts formed by transmission of the different incident wave-fronts into the scattering material; and
    measuring a linear relation between an incident wave-front and a transmission wave-front corresponding to each other as the transmission matrix.

4. A method for forming a three-dimensional holographic image comprising:
    identifying a reflection matrix of a scattering layer provided in a screen;
    calculating an incident wave-front corresponding to wave-front information for forming a three-dimensional holographic image, using the identified transmission matrix; and
    forming the calculated incident wave-front by controlling a projector to modulate a projector or controlling a wave-front control to modulating a light projected from a light source and forming a three-dimensional holographic image by reflecting of a scattering layer provided in the screen after projecting the formed incident wave-front to the screen,
    wherein a reflection matrix of the scattering layer is measured based on a linear relation between an incident wave-front of a light incident on the scattering layer and a reflection wave-front of a light reflected in the scattering layer.

5. The method for forming the three-dimensional holographic image of claim 4, wherein the identifying of the reflection matrix of the scattering material comprises,
    storing and managing the pre-measured reflection matrix in a storage unit; and
    extracting the reflection matrix from the storage unit.

6. A method for forming a three-dimensional holographic image comprising:
    identifying a reflection matrix of a scattering layer provided in a screen;
    calculating an incident wave-front corresponding to wave-front information for forming a three-dimensional holographic image, using the identified transmission matrix; and
    forming the calculated incident wave-front by controlling a projector to modulate a projector or controlling a wave-front control to modulating a light projected from a light source and forming a three-dimensional holographic image by reflecting of a scattering layer provided in the screen after projecting the formed incident wave-front to the screen,
    wherein the identifying of the reflection matrix of the scattering layer provided in the screen comprises,
    controlling the light source and the wave-front control to different incident wave-fronts to be projected to the scattering material;
    measuring reflection wave-fronts formed by transmission of the different incident wave-fronts into the scattering material; and
    measuring a linear relation between an incident wave-front and a reflection wave-front corresponding to each other as the reflection matrix.

7. An apparatus for forming a three-dimensional holographic image comprising:
a light source for projecting a light;
a modulation unit for forming incident wave-front by modulating the light;
a scattering material for forming a transmission wave-front by scattering the formed incident wave-front; and
a controller for calculating a needed incident wave-front based on wave-front information needed to form a three-dimensional holographic image and a transmission matrix of the scattering material and for forming the calculated incident wave-front and controlling the light source and the modulation unit to project the calculated incident wave-front to the scattering material,
wherein the controller controls the light source and the wave-front control to project different incident wave-fronts to the scattering material, and
measures transmission wave-fronts formed while the different incident wave-fronts are transmitting the scattering material, and
measures a linear relation of an incident wave-front and a transmission wave-front corresponding to each other as the transmission matrix.

8. The apparatus for forming the three-dimensional holographic image of claim 7, further comprising:
a storage unit for storing and managing the pre-measured transmission matrix,
wherein the controller calculates the needed incident wave-front based on the transmission matrix extracted from the storage unit.

9. An apparatus for forming a three-dimensional holographic image comprising:
a modulation unit for forming an incident wave-front by modulating a light;
a screen comprising a scattering layer for forming a reflection wave-front by scatter-reflecting the formed incident wave-front; and
a controller for calculating a needed incident wave-front based on wave-front information needed to form a three-dimensional holographic image and a reflection matrix of the scattering material and for forming the calculated incident wave-front and controlling the light source and the modulation unit to project the calculated incident wave-front to the scattering material,
wherein the controller controls the modulation unit to project different incident wave-fronts to the scattering material, and
measures reflection wave-fronts formed while the different incident wave-fronts are reflected in the scattering material, and
measures a linear relation of an incident wave-front and a transmission wave-front corresponding to each other as the reflection matrix.

10. The apparatus for forming the three-dimensional holographic image of claim 9, wherein the modulation unit comprises a light source and a wave-front control, or a projector.

11. The apparatus for forming the three-dimensional holographic image of claim 9, further comprising:
a storage unit for storing and managing the pre-measured reflection matrix,
wherein the controller calculates the needed incident wave-front based on the reflection matrix extracted from the storage unit.

* * * * *